US006181034B1

(12) United States Patent
Reichel et al.

(10) Patent No.: US 6,181,034 B1
(45) Date of Patent: Jan. 30, 2001

(54) RADIAL OSCILLATING MOTOR

(75) Inventors: Klaus Reichel, Domsühl; Stefan Beetz, Idar-Oberstein, both of (DE)

(73) Assignee: PNP Luftfedersysteme GmbH, Crivitz (DE)

( * ) Notice: Under 35 U.S.C. 154(b), the term of this patent shall be extended for 0 days.

(21) Appl. No.: 09/508,357

(22) PCT Filed: Sep. 23, 1998

(86) PCT No.: PCT/DE98/02836

§ 371 Date: Mar. 9, 2000

§ 102(e) Date: Mar. 9, 2000

(87) PCT Pub. No.: WO99/17030

PCT Pub. Date: Apr. 8, 1999

(30) Foreign Application Priority Data

Sep. 29, 1997 (DE) ... 197 42 882
Mar. 23, 1998 (DE) ... 198 12 477

(51) Int. Cl.[7] ... H02K 33/00; F01C 9/00
(52) U.S. Cl. ... 310/36; 277/407; 92/125
(58) Field of Search ... 277/407; 92/120, 92/121, 123, 122, 124, 125; 310/36, 37, 38, 39

(56) References Cited

U.S. PATENT DOCUMENTS 2,781,027 2/1957 Henry ... 121/97

FOREIGN PATENT DOCUMENTS 1 553 077 8/1966 (DE) .
22 28 531 C2 2/1973 (DE) .
32 22 982 A1 6/1982 (DE) .
44 07 308 C1 8/1995 (DE) .
195 03 331C1 8/1996 (DE) .
0 388 711 A1 9/1990 (EP) .
0 362 534 B1 3/1994 (EP) .

OTHER PUBLICATIONS

59074059 Apr. 13, 1984 Japanese abstract Patent Abstract of Japan, vol. 010, No. 077 (M–464) Mar. 26, 1986 & JP 60 220209 A.

*Primary Examiner*—Nestor Ramirez
*Assistant Examiner*—Judson H. Jones
(74) *Attorney, Agent, or Firm*—Darby & Darby

(57) ABSTRACT

Radial oscillating motors are generally fitted with an outer overflow oil line in order to protect sealing elements. This requires an over large amount of devices and system expenditure. Large amounts of installation space are also required for oscillating motors of this kind. The invention provides a radial oscillating motor wherein each bearing (29) is hydraulically connected to a discharge chamber (14) via a main duct (30) in addition to radial ducts (31, 15, 16, 35, 37, 38) and axial ducts (32, 36) in a driven shaft (7). A non-return valve opening out in the direction of the discharge chamber (14) is inserted into the ducts (31, 32, 37, 38).

7 Claims, 6 Drawing Sheets

RADIAL OSCILLATING MOTOR

BACKGROUND OF THE INVENTION

1. Field of the Invention

The invention relates to a radial oscillating motor having a stator in a housing, a stator wing being disposed in the housing. A rotor having a driven shaft is supported in the housing and associated therewith is an identical number of rotor wings. The stator wing and the rotor wing in conjunction with the housing, the cylinder portion of the drive shaft and the two covers form a pressure chamber and one discharge chamber, which are sealed towards the inside by a frame sealing element which is inserted in the stator wing and the rotor wing, and which are sealed towards the outside and the inside by an annular sealing element. Further, a bearing, which has a pressure relief, is disposed in each cover of the stator between two sealing locations.

Such oscillating motors are used in particular in the aircraft and vehicle industry.

2. Description of the Related Art

DE 32 22 982 A1 describes a radial oscillating motor consisting of, for example, a housing, which has inside at least one stator wing and is closed off at the ends with covers, and a rotor which includes a driven shaft supported in the covers and at least one rotor wing. The rotor wing can oscillate within certain limits inside a free space in the housing and forms with the stator wing of the housing at least one pressure chamber and one discharge chamber. To ensure the internal leak-tightness between the pressure chamber and the discharge chamber, the stator wing and the rotor wing are provided with a form-fitting sliding sealing element which seals against the lateral covers and the radial housing wall and the driven shaft, respectively. To ensure external leak-tightness between the rotor and each cover, a sliding sealing ring which can be supported in the respective cover as well as in the rotor, is typically mounted on the driven shaft.

A number of other embodiments and modifications are possible.

The driven shaft is secured on the side of the journal by an additional sealing ring which can be fabricated from different rotary shaft seals.

Bearings are arranged on both sides of the driven shaft between the shaft seals, with overflow oil lines arranged in the region of the bearings for returning to the tank the leaked oil accumulating between the shaft seals. This arrangement not only protects the bearings and the sealing elements from an excessive pressure load, but also prevents damage to the bearings and the sealing elements and eliminates an excessive initial torque on the oscillating motor. The overflow oil lines are also provided with devices which maintain the leaked oil flow at a predetermined pressure, so that sufficient hydraulic oil is supplied to the bearings for lubrication.

Overflow lines of this type are technically required, but are implemented only reluctantly since technically complex devices and facilities are required which add to the cost. Moreover, a great number of pipes are required which significantly limits the application of the oscillating motors because of the limitations imposed by the mounting conditions.

In certain applications, it is disadvantageous to remove the overflow oil from the oscillating motor, for example, when the control system for the oscillating motor is malfunctioning and the rotor has to be kept in a fixed position. Leakage typically causes the rotor to yield to an externally applied load which may pose a safety risk.

It is therefore the object of the invention to develop a radial oscillating motor of the aforedescribed type without overflow oil lines and with bearings which operate at a reduced pressure while still receiving a sufficient quantity of lubricating oil.

SUMMARY OF THE INVENTION

The invention eliminates the aforedescribed disadvantages found in the state in the art.

The invention can be easily implemented by using simple manufacturing methods and using a simple non-return valve and can therefore be manufactured at low cost.

The invention also has particularly advantages applications. Unlike an external overflow oil line, the invention represents a very elegant solution which allows the oscillating motor to be used in finished products offering only limited mounting spaces.

As a further advantage, the opening pressure of the non-return valve can be set so that the pressure, which builds up before the non-return valve, provides an adequate supply of lubricating oil for the bearing. This protects the bearings and extends the useful life of the bearing and the seal.

In an alternative advantageous embodiment, a separate non-return valve can be provided for each bearing, or a common non-return valve can be provided for all bearings. In this way, the invention can be easily adapted to oscillating motors of different designs.

According to a particularly advantageous embodiment, both bearings are continuously connected to the discharge chamber as well as to the pressure chamber. Since the function of the discharge chamber alternates with that of the pressure chamber, both bearings are continuously connected to the discharge chamber independent of their function. This arrangement prevents a pressure build-up on one of the two bearings if one oscillating direction has to be maintained over an extended time.

The invention will now be described in detail with reference to two embodiments.

DETAILED DESCRIPTION OF THE PRESENTLY PREFERRED EMBODIMENTS

Figure 1:
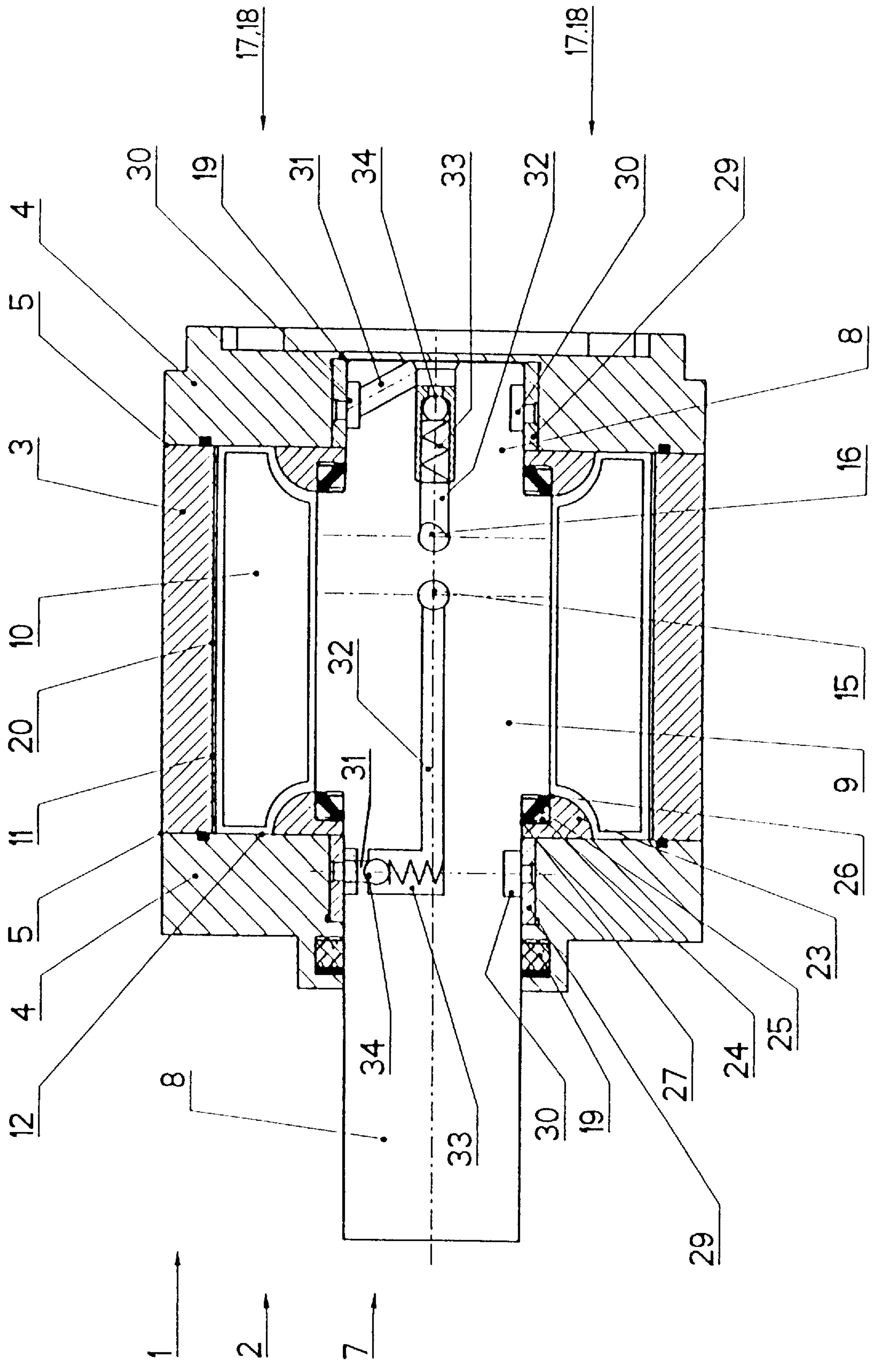
FIG. 1 shows a first embodiment of an oscillating motor.
Figure 2:
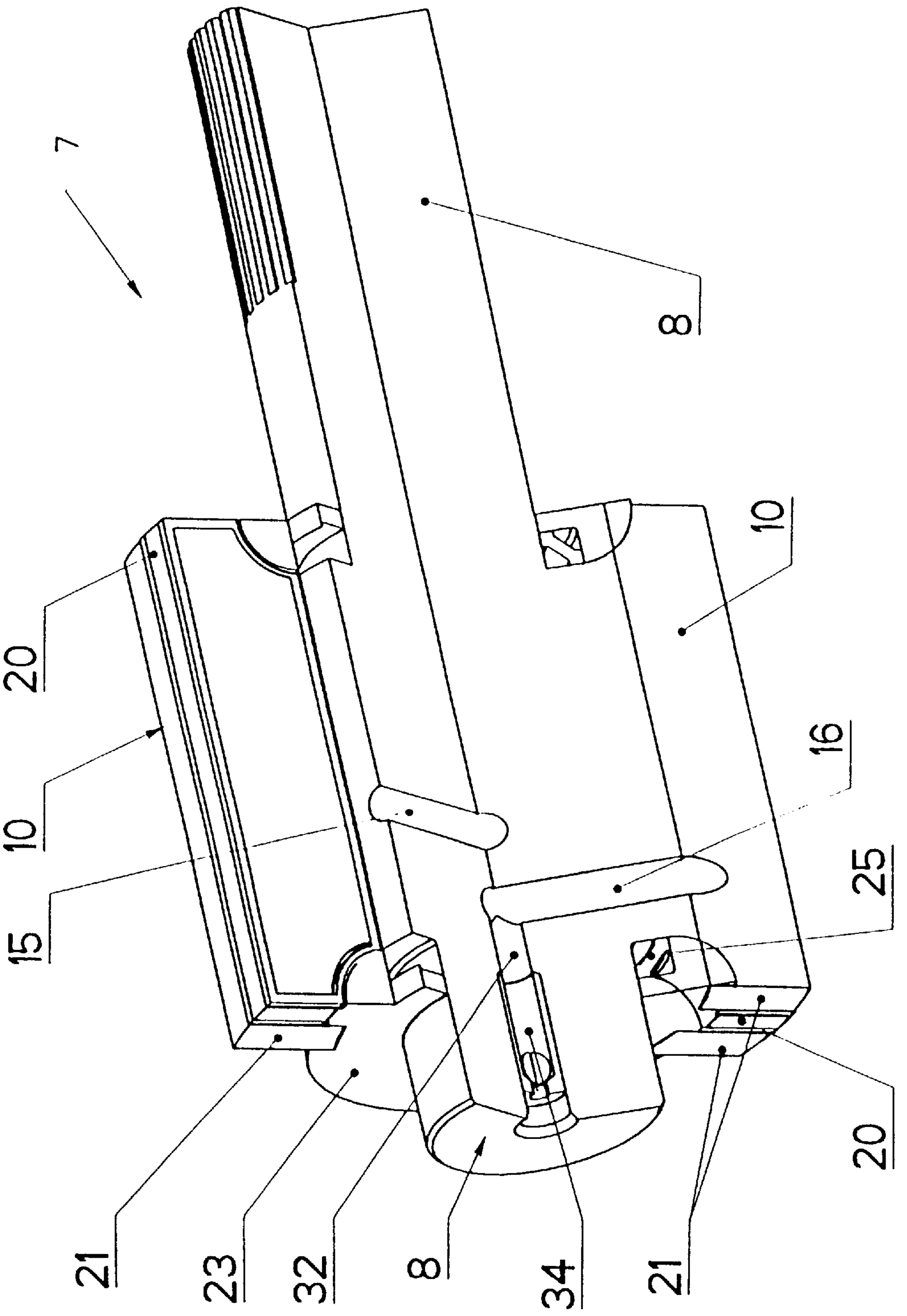
FIG. 2 is a perspective sectional view of the rotor of the first embodiment.
Figure 3:
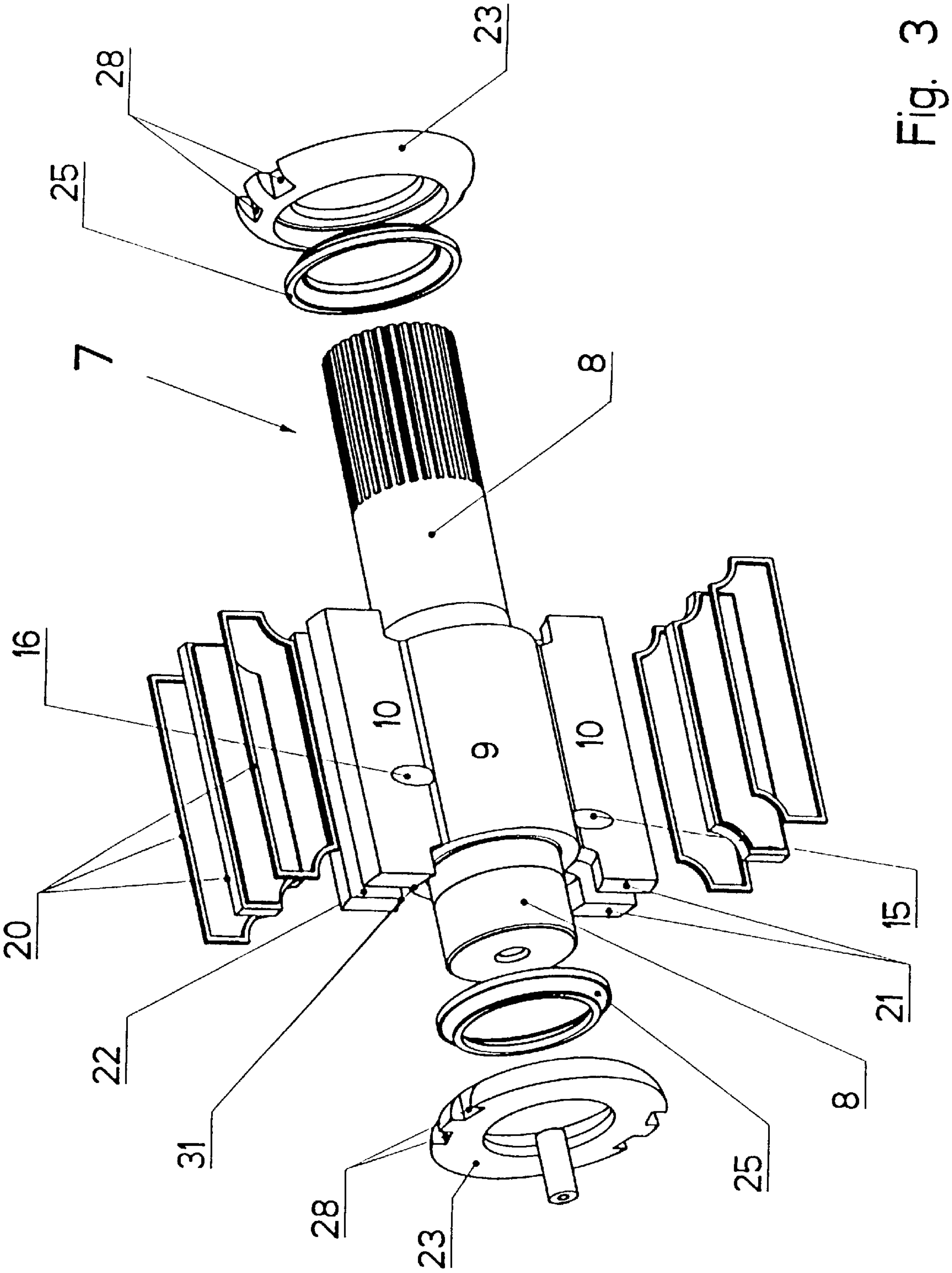
FIG. 3 is an exploded view of the rotor of the first embodiment.
Figure 4:
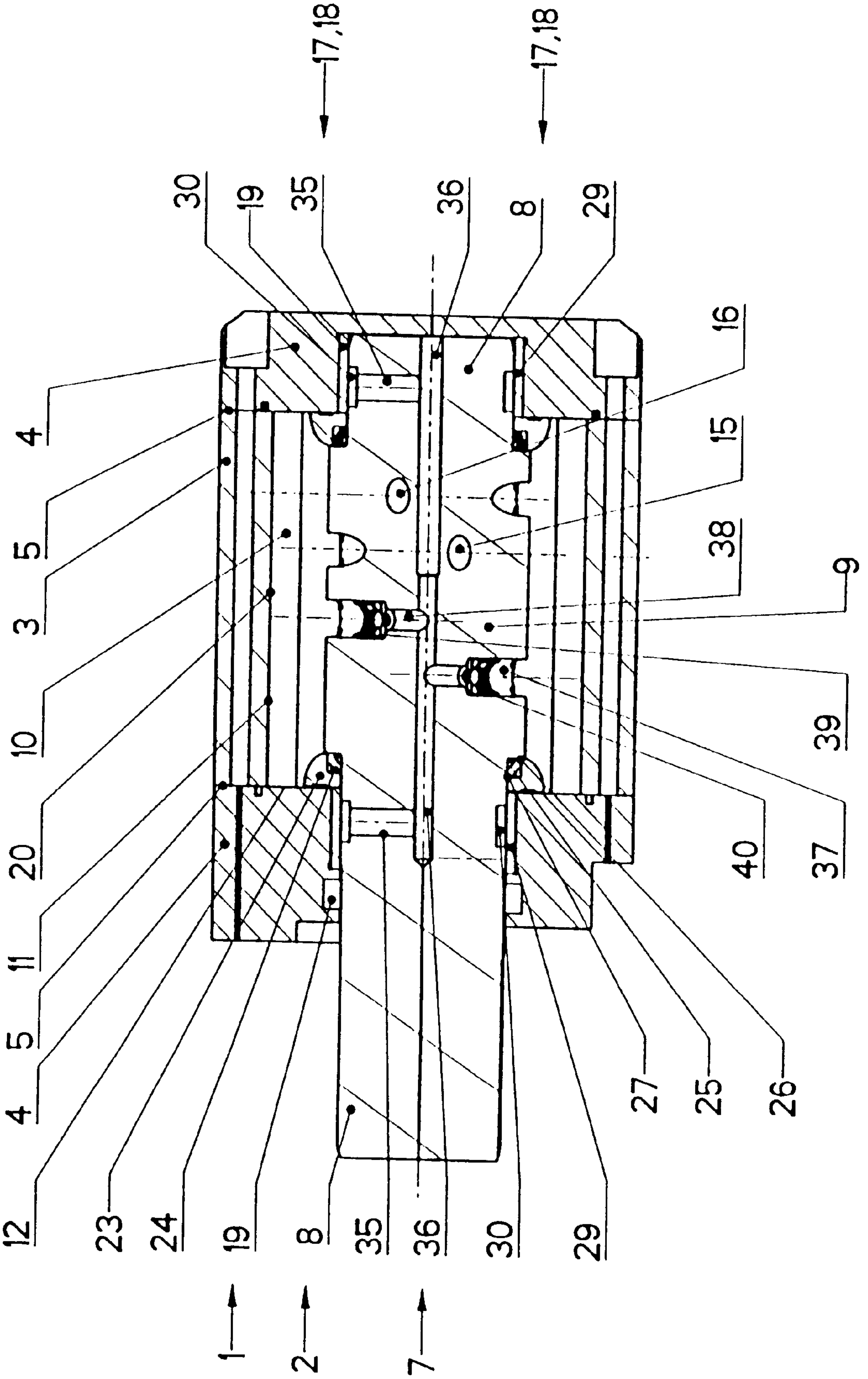
FIG. 4 shows a second embodiment of an oscillating motor.
Figure 6:
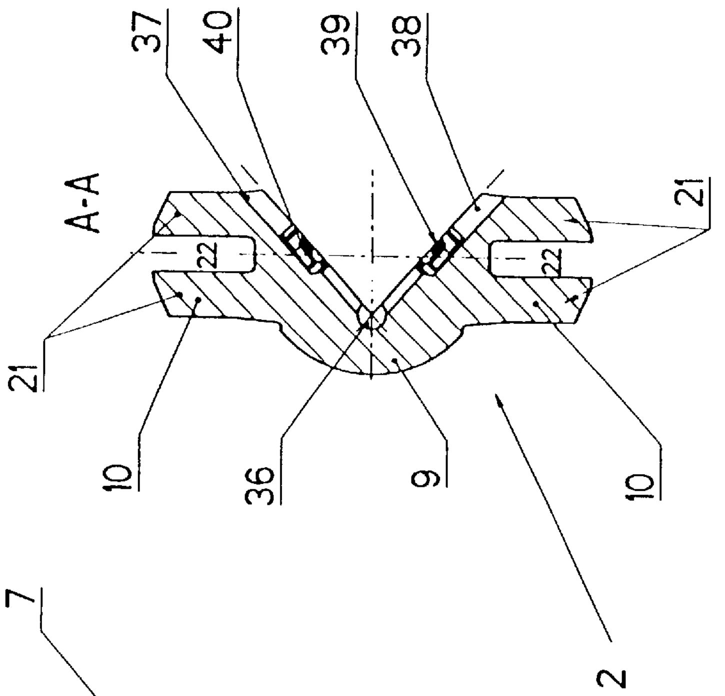
FIG. 6 is a section of the rotor of the second embodiment along the line A—A of FIG. 5.
Figure 5:
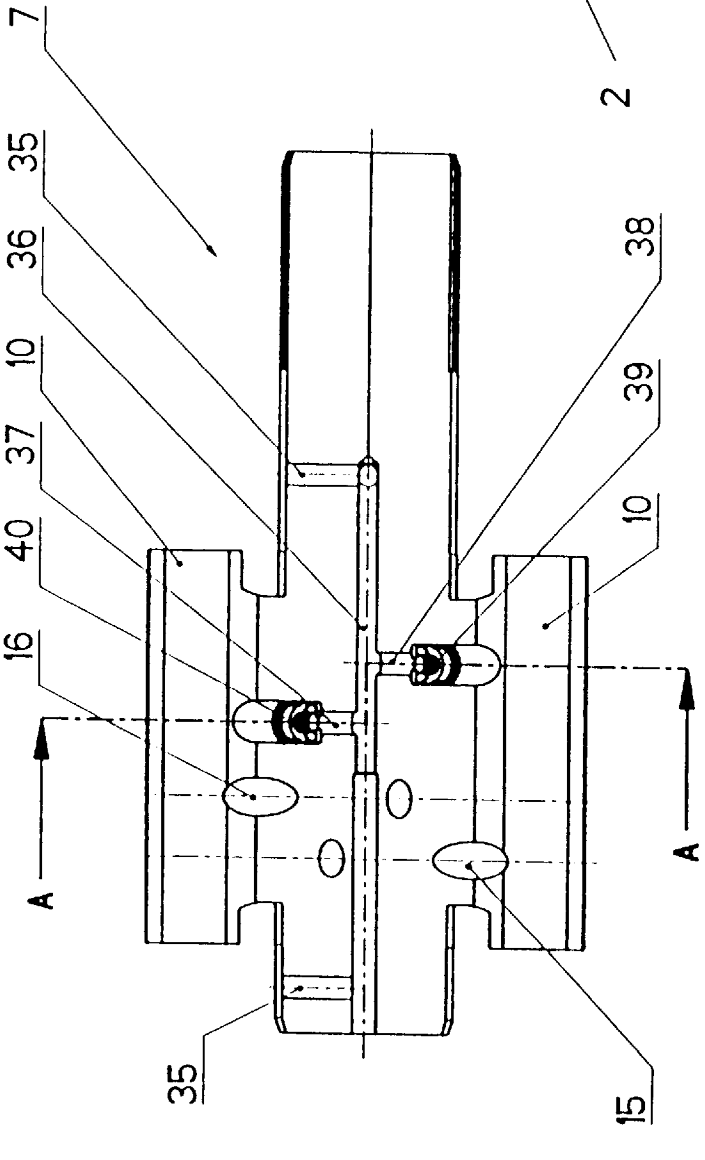
FIG. 5 is a sectional view of the rotor of the second embodiment.
Figure 7:
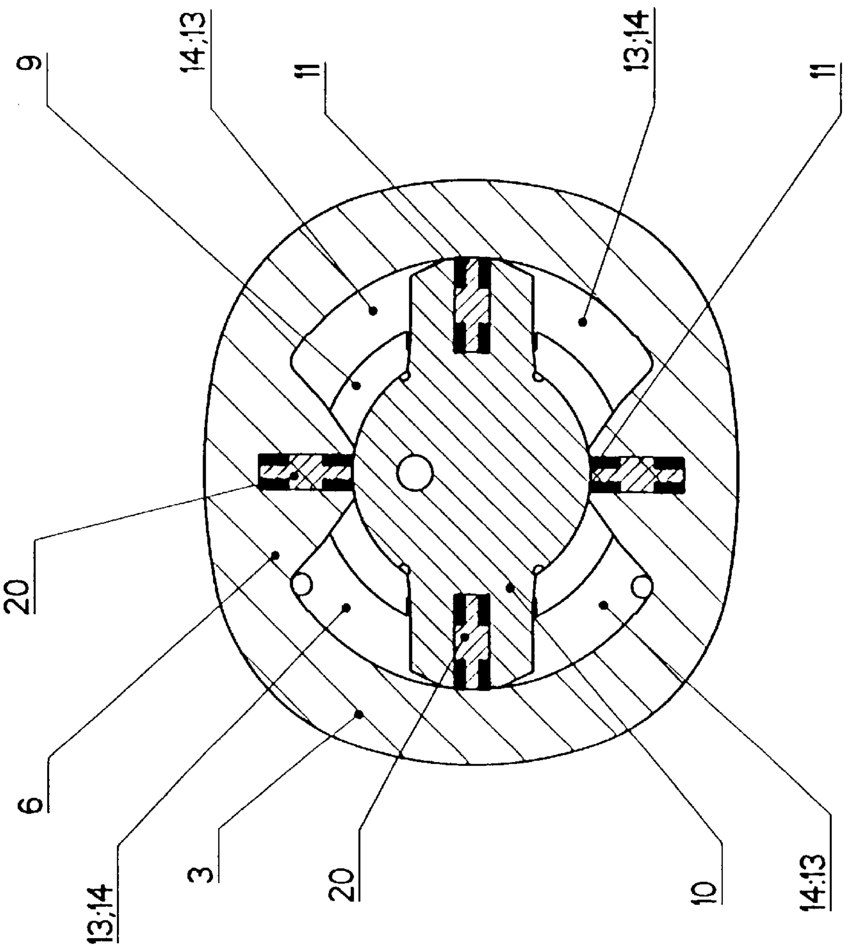
FIG. 7 is a cross section of the oscillating motor.

The radial oscillating motor mainly consists of an outer stator 1 and an inner rotor 2.

The stator 1 includes a housing 3 and covers 4 disposed on the two end faces of the housing wall 3. The covers 4 are attached to the housing 3 with a screws (not shown). The end faces of the housing 3 and the inner surfaces of the cover 4 are formed as continuous planar surfaces which are joined with each other.

A locking ring 5 disposed on each side of the covers defines the radial position of the housing 3 and the cover 4 relative to one another.

Each of the covers 4 has a through hole for receiving a bearing. A cylindrical housing bore is disposed inside the housing 3. The housing bore is subdivided into two opposing chambers by two opposing stator wings 6 which are oriented in the radial direction.

The rotor 2, on the other hand, consists of a driven shaft 7 having bearing journals 8 disposed at each end, with a cylindrical section 9 disposed between the bearing journals 8. Two opposing, radially oriented rotor wings 10 are arranged is a region of the cylindrical section 9. The rotor 2 is fitted in the housing 3 of the stator 1 in such a way that an axial sealing gap 11 is formed between the head of the rotor wing 10 and the inner wall of the housing 3 as well as between the head of the stator wing 6 and the circumferential surface of the cylindrical section 9. A respective radial sealing gap 12 is also formed between the end faces of the rotor wing 10 and the end faces of the stator wings 6 and the respective inner surfaces of the two covers 4.

Accordingly, each rotor wing 10 subdivides one of the two empty chambers located in the stator into a pressure chamber 13 and a discharge chamber 14, thereby forming two opposing pressure chambers 13 and two opposing discharge chambers 14, the role of which alternates during operation. The two pressure chambers 13 and the two discharge chambers 14 are connected with each other by inner ducts 15 and 16, with one pressure chamber 13 being connected to a supply fitting 17 and one discharge chamber 14 being connected to a discharge fitting 18. For sealing to the outside, conventional sealing elements 19 are disposed between the covers 4 and the respective bearing journals 8.

Two ensure the inner leak-tightness between the adjacent pressure chambers 13 and the discharge chambers 14, a frame sealing element 20 is disposed on each rotor wing 10 and on each stator wing 6. For this purpose, each stator wing 6 and each rotor wing 10 includes two longitudinally extending legs 21 which together form a center groove 22 extending over the entire height and over the entire length. The frame sealing element 20 is pressed into this groove 22. In this way, the circumference and the end faces of each rotor wing 10 are sealed against the housing 3 and the covers 4.

In the transition region from the bearing journal 8 to the cylinder portion 9, a sliding sealing ring 23 which is secured against rotation and can move in the axial direction, is placed on the driven shaft 7. The lateral surface and the outer sliding and sealing surface of the sliding sealing ring 23 are in contact with the inner surface of the cover 4, whereas the inner sealing surface of the sliding sealing ring 23 rests against the circumferential surface of the drive shaft 7.

The side of the sliding sealing ring 23 which faces away from the cover 4, has a recess which is designed as an mounting space 24 for an elastomer seal which is formed as a diagonal sealing ring 25. This mounting space 24—in cooperation with a stepped diameter on the cylindrical section 9 of the driven shaft 7—forms a first circumferential sealing edge 26 and a second circumferential sealing edge 27. The diagonal sealing ring 25 is formed with two sealing sections and with an interposed and moveable guide section and fitted in the mounting space 24 in such a way that one sealing portion contacts the first sealing edge 26 and the other sealing portion contacts the second sealing edge 27.

The sliding sealing ring 23 and the rotor 2 are secured against rotation.

For this purpose, the end faces of the two legs 21 of each rotor wing 10 are formed, for example, as tappets, with the circumference of the sliding sealing ring 23 having corresponding recesses, for example in the form of a pair of axial grooves 28, which are in engagement with each other.

The driven shaft 7 is supported in the covers 4 of the housing 3, with a corresponding bearing 29, which can be in the form of a slide bearing, a ball bearing or a roller bearing, disposed in the region of each bearing journal 8. Each of the two bearings 29 is enclosed axially on both sides by a sealing element which is formed on the inside by a sliding sealing ring 23 and on the outside by the annular sealing element 19.

To relieve the pressure, an annular main duct 30 for the leaked oil is formed in the inner ring of the bearing 29 or in the bearing journal 8 of the driven shaft 7. Each of the two main ducts 30 forms a pressure relief as described with reference to the following two embodiments.

In a first embodiment, a connection is established through a radial duct 301 and an axial duct 32 to one of the ducts 15 or 16 which connect, as discussed above, the respective pressure chambers 13 or discharge chambers 14, respectively. The radial channel 31 or the axial channel 32 include a mounting space 33 for a non-return valve 34. This non-return valve 34 is spring loaded and closes towards the bearing 29.

With this arrangement, each bearing 29 is connected with one of the two ducts 15 or 16 which connect the two pressure chambers or discharge chambers 13 and 14.

Alternatively, the two bearings 29 can be associated with a common connecting duct which receives a common non-return valve 34 and is connected with one of the two ducts 15 or 16.

In a second embodiment, the two annular main ducts 30 are connected with each other through a radial collecting duct 35 and a common axial duct 36. The axial duct 36 is connected, on one hand, through a radial duct 37 with one of the two pressure chambers 13 and, on the other hand, through a radial duct 38 with one of the two discharge chambers 14. A respective non-return valve 39 and 40 is disposed in the radial duct 37 as well as in the radial duct 38. Both non-return valves 39, 40 are oriented so as to open towards the respective discharge chamber 14.

During the operation of the oscillating motor, a pressure medium consisting of oil leaked from the pressure chamber 13 reaches the region of the bearing 29 via the axial sealing gap formed between the sliding sealing ring 23 and the cylinder portion 9 of the rotor 2. The leaked oil accumulates at this location since the oil cannot drain freely via the annular sealing element 19.

In the first embodiment, the first non-return valve 34 opens when the dynamic pressure of the leaked oil has reached the required opening pressure at the respective bearing 29, so that the leaked oil from the first bearing 29 can flow freely to the discharge chambers 14 and thereby to the reservoir of the hydraulic system. The opposite non-return valve 34 of the other bearing 29 remains closed, since the pressure from the pressure chamber 13 also acts on the non-return valve 34.

Depending on the rotation direction of the oscillating motor, both bearings 29 are thus alternatingly relieved of the dynamic pressure of the leaked oil.

In the second embodiment, the first non-return valve 39 or 40 opens when the common dynamic pressure of the leaked oil from both bearings 29 has reached the required opening pressure. The oil leaked from both opposing bearings 29 can then flow to the discharge chambers 14 and thereby to the reservoir of the hydraulic system. The opposite non-return valve 39 or 40 remains closed, since the pressure from the pressure chambers 13 also acts on the non-return valve 39 or 40.

In this way, the dynamic pressure is continuously reduced at both bearings 29 simultaneously.

List of the Reference Numerals

1 stator
2 rotor
3 housing
4 cover
5 locking ring
6 stator wing
7 driven shaft
8 bearing journal
9 cylinder portion
10 rotor wing
11 axial sealing gap
12 radial sealing gap
13 pressure chamber
14 discharge chamber
15 radial duct
16 radial duct
17 supply fitting
18 discharge fitting
19 outer sealing element
20 frame sealing element
21 leg
22 groove
23 sliding sealing ring
24 mounting space
25 diagonal sealing ring
26 first sealing edge
27 second sealing edge
28 actual groove
29 bearing
30 annular main duct
31 radial duct
32 axial duct
33 mounting space
34 non-return valve
35 radial duct
36 axial duct
37 radial duct
38 radial duct
39 non-return valve
40 non-return valve

What is claimed is:

1. A radial oscillating motor, comprising:

a stator having a housing and covers on both sides, wherein at least one stator wing is disposed in the housing;

a rotor having a driven shaft supported in the covers and an identical number of rotor wings, wherein the stator wing and the rotor wing in conjunction with the housing, the cylinder portion of the drive shaft and the two covers form at least one pressure chamber and one discharge chamber, which are sealed towards the inside by a frame sealing element, which is inserted in the stator wing and the rotor wing, and which are sealed towards the outside and the inside by an annular sealing element; and a bearing, which has a pressure relief, is disposed in each cover of the stator between two sealing locations;

wherein that each bearing has a hydraulic connection to the discharge chamber through a main duct and through radial ducts and axial ducts disposed in the driven shaft and that a non-return valve, which opens in the direction of the discharge chamber, is placed in these ducts.

2. The radial oscillating motor according to claim 1, wherein the non-return valve is implemented as a spring-loaded and non-return valve.

3. The radial oscillating motor according to claim 2, wherein the spring setting of the non-return valve is preset to an opening pressure which corresponds to a required lubricating pressure for the bearing.

4. The radial oscillating motor according to claim 3, wherein a first bearing is connected to the discharge chamber and the other bearing is connected to the pressure chamber.

5. The radial oscillating motor according to claim 4, wherein the axial duct of the first bearing merges into the radial duct which connects the two discharge chambers with each other, and the axial duct of the other bearing merges into the radial duct which connects the two pressure chambers with each other.

6. The radial oscillating motor according to claim 5, wherein each bearing is connected with one of the two radial ducts via a common connecting duct and that a common non-return valve is disposed in the common connecting duct.

7. The radial oscillating motor according to claim 3, wherein both bearings are connected through a common axial duct, on one hand, through a radial duct with the discharge chamber and, on the other hand, through an axial duct with the pressure chamber, wherein the first non-return valve is disposed in the radial duct and the second non-return valve is disposed in the radial duct.

* * * * *